United States Patent [19]
Futamura

[11] 3,782,830
[45] Jan. 1, 1974

[54] OPTICAL ALIGNING DEVICE FOR POSITIONING THE ELECTRODE OF A SPARK DISCHARGE MACHINING APPARATUS

[75] Inventor: Shoji Futamura, Kawasaki, Japan

[73] Assignee: Institute of Technology Precision Electrical Discharge Works, Kawasaki, Kanagawa, Japan

[22] Filed: Aug. 25, 1971

[21] Appl. No.: 174,760

[30] Foreign Application Priority Data
   Sept. 7, 1970   Japan................................ 45/78280

[52] U.S. Cl...................... 356/138, 356/153, 350/81
[51] Int. Cl. ........................................... G01b 11/26
[58] Field of Search.................... 356/138, 153, 156, 356/170–172, 247, 253–255; 350/10, 80, 81

[56] References Cited
UNITED STATES PATENTS

| | | | |
|---|---|---|---|
| 2,247,113 | 6/1941 | Benford | 356/150 |
| 2,368,434 | 1/1945 | Turrettini | 350/81 X |
| 3,300,618 | 1/1967 | Sciaky | 350/81 X |
| 3,331,119 | 7/1967 | Gingell et al. | 350/81 X |
| 3,388,848 | 6/1968 | Youmans et al. | 350/81 X |
| 3,444,612 | 5/1969 | Pennings | 350/81 X |
| 3,615,138 | 10/1971 | Pedrotti et al. | 350/81 X |

FOREIGN PATENTS OR APPLICATIONS

| | | | |
|---|---|---|---|
| 1,025,745 | 4/1966 | Great Britain | 356/150 |

*Primary Examiner*—David H. Rubin
*Attorney*—Christensen & Sanborn

[57] ABSTRACT

Disclosed is a spark discharge machining apparatus including a machining electrode, a worktable for supporting a work-piece to be machined and optical means for accurately establishing the location of the electrode relative to the worktable. The worktable is translatable for measured distances into mutually perpendicular directions such that a work-piece positioned thereon can be selectively aligned relative to the electrode. The optical device is positionable at a precisely determinable location on the worktable and includes a tool microscope and one or more prisms for reflecting an image of a reference point on the bottom surface of the electrode into the field of view of the microscope. By moving the worktable such that a reflected image of a reference point on the electrode is brought into coincidence with a reference point in the optical device, the location of the electrode relative to the worktable is precisely determined.

14 Claims, 5 Drawing Figures

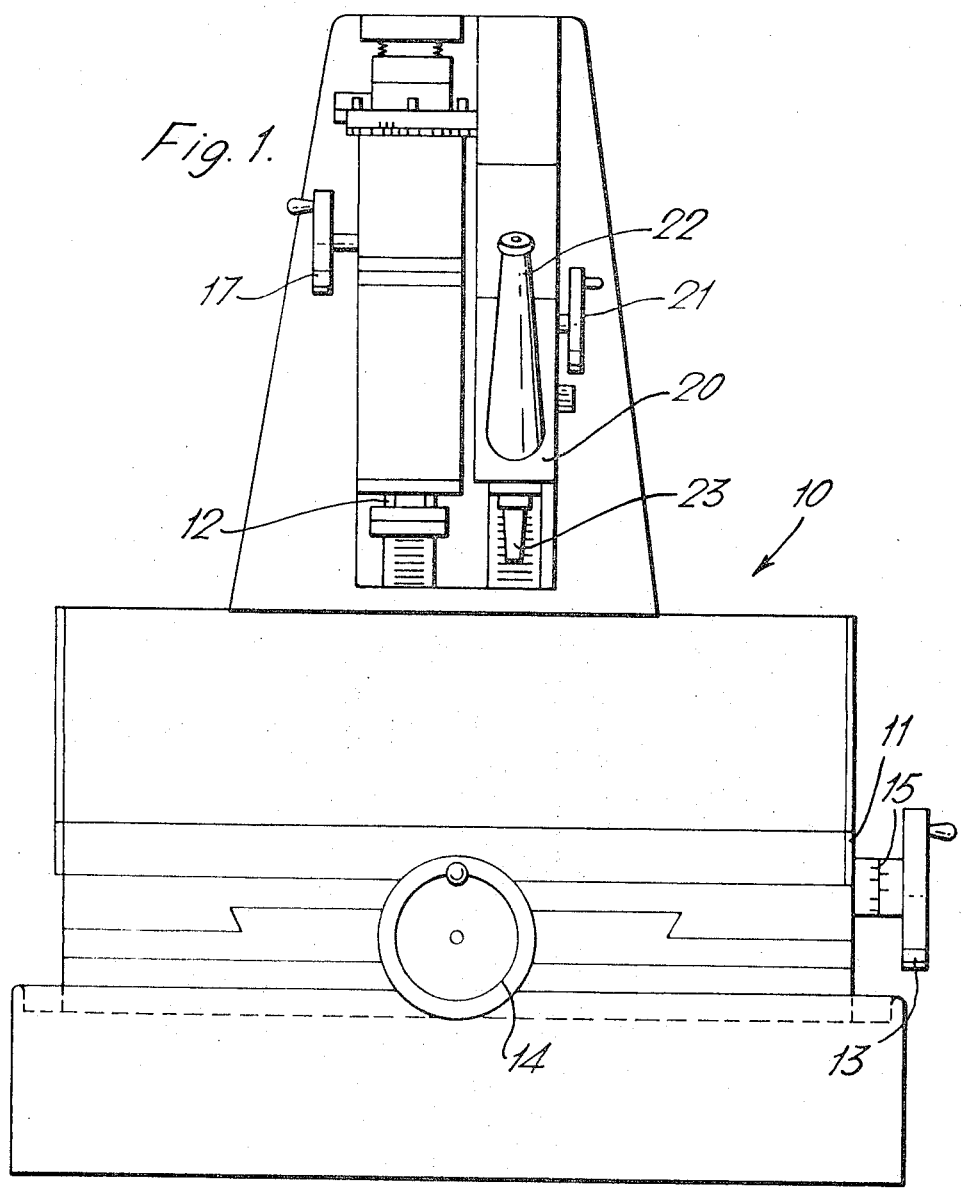

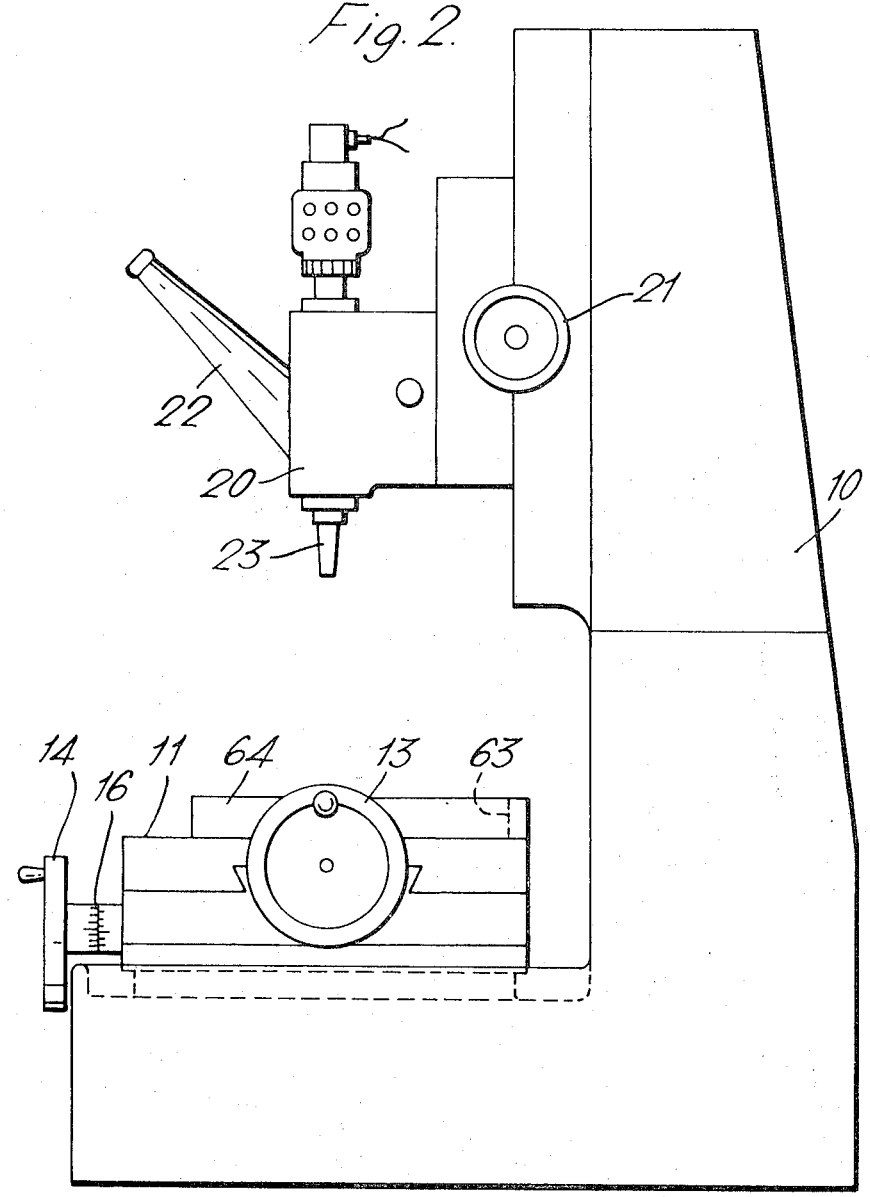

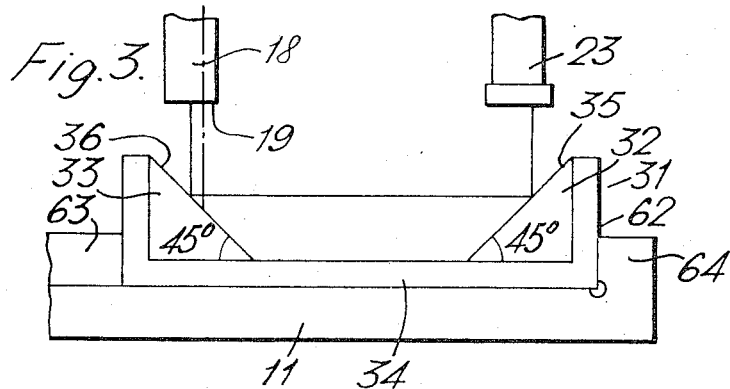
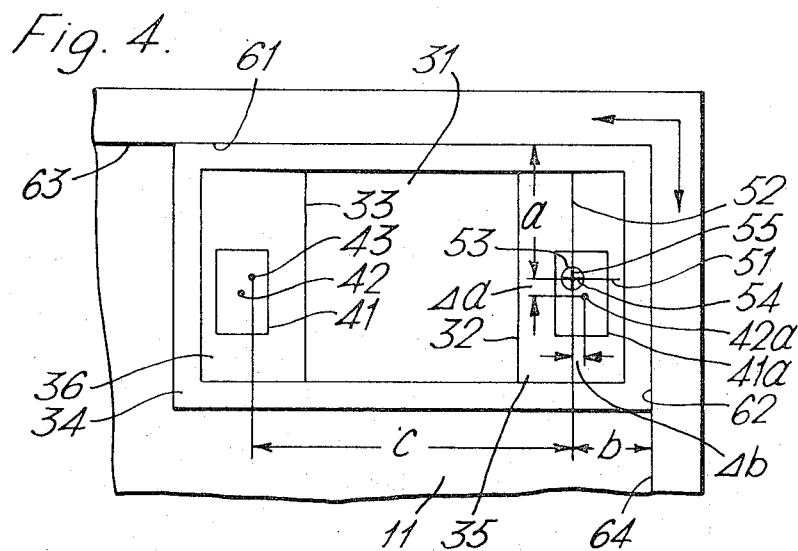
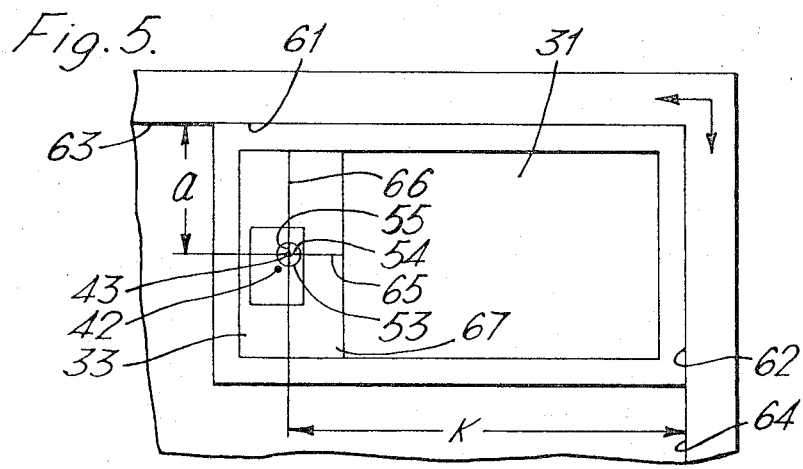

OPTICAL ALIGNING DEVICE FOR POSITIONING THE ELECTRODE OF A SPARK DISCHARGE MACHINING APPARATUS

The invention relates to a spark discharge machining apparatus and, more particularly, to a device for accurately positioning the machining electrode relative to the work-piece in the machining apparatus.

In a spark discharge machining apparatus, in order to work a desired portion of a work-piece by means of an electrode, it is necessary to accurately determine the relative position of the electrode and the work-piece. To put it in detail, when the electrode is lowered toward the work-piece fixed on the table of the machine, the electrode must be so positioned as to be exactly aligned with the portion of the work-piece to be machined. It has hitherto been customary to mark the center of the bottom surface of the electrode and that of the portion of the work-piece to be machined and, observing the two marks through a prism or a lens interposed therebetween, move the worktable to such a position that the two marks coincide. This prior art arrangement, however, has various disadvantages such as that it is necessary to provide an optical instrument such as a prism or a lens between the electrode and the work-piece, and that the optical axis of the instrument must always be held parallel with that of the spindle to which the electrode is secured, with resulting complication of the mechanism for maintaining the parallel relation. If the relation fails, an error will result in positioning.

Accordingly, it is one object of the invention to provide a new and improved positioning device which eliminates the above disadvantages of the prior art devices.

Another object of the invention is to provide a new and improved device for accurately positioning the machining electrode relative to a work-piece in a spark discharge machining apparatus, without necessity of using a prism between the electrode and the work-piece.

Another object of the invention is to provide such a positioning device as aforesaid which has a very high degree of accuracy and precision in positioning the electrode relative to the work-piece.

In accordance with the invention, a tool microscope is provided on a spark discharge machining apparatus, and a reflective surface such as a prism is disposed on the worktable below the spindle to which the machining electrode is secured, so that the image of the bottom surface of the electrode is projected on the reflective surface. This image is projected on another similar reflective surface and observed through the microscope. Without the second reflective surface the image on the first reflective surface may be observed directly through the microscope. Thus, the image of the bottom surface of the electrode and the two crossed hairlines of the microscope can be seen in the field of the microscope. The reflective surfaces are inclined at such an angle that if light is projected onto the reflective surface, the reflected light therefrom advances in parallel with the axis of the spindle.

On the worktable of the machine there are formed X- and Y-axis reference planes parallel with the X- and Y-axes crossing each other at a right angle along which the table is moved. The previously mentioned reflective surface is so positioned that the two crossing hairlines on the reflective surface coincide with the hairlines in the field of the microscope and that the hairlines on the reflective surface is spaced at predetermined distances from the X- and Y-axis reference planes of the worktable. As the worktable is moved in directions parallel with the X- and Y-axis reference planes, the reflective surface is moved with the worktable. Thus, the hairlines on the reflective surface are moved in directions parallel with the X- and Y-axis reference planes.

For positioning of the machining electrode, the electrode is secured to the spindle of the machine. The bottom surface of the electrode has a mark at its center. Then the reflective surface is set at the previously mentioned position. The worktable is then moved such that the hairlines of the microscope and those of the reflective surface coincide in the field of the microscope. This position of the worktable is considered as the reference point or origin. Then, the worktable is moved so that the image of the mark on the bottom surface of the electrode coincides on the crossing point of the hairlines of the microscope. The distances the worktable has been moved from the reference point are measured, and from the distances of movement it is possible to know the distances the center of the bottom surface of the electrode is spaced on the worktable from the X- and Y-axis reference planes. The distances of movement of the worktable can be read on a scale formed on the handles for moving the table.

The microscope may be fixed on the machining apparatus, or it may be attached thereto every time the machine is operated. The reflective surface may be mechanically combined with the microscope.

The invention will be further explained in detail with reference to the accompanying drawings, wherein:

FIG. 1 is a front view of one embodiment of the invention;

FIG. 2 is a side view of FIG. 1;

FIG. 3 is a front view of the principal portion of the machine;

FIG. 4 is a top plan view of FIG. 3; and

FIG. 5 is a view similar to FIG. 4 but showing a modified form thereof.

Referring to the drawings, there is shown a spark discharge machining apparatus generally designated by 10, which comprises a worktable 11 and a spindle 12. The table is movable by means of a handle 13 along an X-axis and by means of a handle 14 along a Y-axis The amount or distance the table is moved can be read on a scale 15, 16 provided on each handle. Various mechanisms for effecting such movement of the table and reading the distance of movement with a high degree of accuracy and precision are well known in the art, and any of them may be used in this invention.

The spindle 12 is movable by means of a handle 17 vertically relative to the table 11. A machining electrode 18 is secured to the lower end of the spindle 12. A tool microscope 20 is provided on the machine 10. The arrangement may be such that the microscope 20 is temporarily attached to the machine every time the machine is operated. The microscope 20 is movable by means of a handle 21 vertically relative to the table 11, and comprises an eye-piece portion 22 and an objective lens portion 23. In the field of the eye-piece 22 two hairlines 54 and 55 crossing each other at a right angle appear, as is usual with microscopes of this type.

A prism device 31 comprises a pair of prisms 32 and 33, which are mounted on a base 34 so that their inclined reflective surfaces 35 and 36 face each other, the angle of inclination being 45° with respect to the horizontal plane. The relative position of the two prisms is fixed. The prism 32 is positioned below the objective lens portion 23 of the microscope 20 and the prism 33, below the spindle 12. Thus, the bottom surface 19 of the machining electrode 18 appears as an image 41 on the reflective surface 36 of the prism 33. The image 41 will then appear as an image 41a on the reflective surface 35 of the other prism 32. In other words, the image 41a appears in the field of the eye-piece 22. The reference numeral 42 designates the image of a mark put at the center of the bottom surface 19 of the electrode 18 as appearing on the reflective surface 36; 43 designates a hypothetical image of the axis of spindle 12; and 42a is the image of 42 as appearing on the reflective surface 35.

The reflective surface 35 of the prism 32 has hairlines 51 and 52 thereon crossing each other at a right angle and extending along the X- and Y-axes, respectively. As previously mentioned, in the field of the eye-piece the hairlines 54 and 55 appear extending along the X- and Y-axes, respectively.

For positioning of the electrode 18, the base 34 of the prism device 31 is placed on the table 11 so that the adjacent lateral surfaces 61 and 62 of the base 34 contact the X- and Y axes reference planes 63 and 64 of the table, respectively. The lateral surfaces 61 and 62 are parallel with the hairlines 51, 52 and 54, 55, respectively; and the planes 63 and 64 of the table 11 are parallel with the X- and Y-axes along which the table 11 is moved. At first, the table 11 is moved along the X- and Y-axes such that the hairlines 51 and 52 coincide with the hairlines 54 and 55, respectively. Under this condition, the table 11 is considered as positioned at the reference point or origin of movement along the X- and Y-axes.

Then, the table 11 is moved along the Y-axis until the image 42a of the center of the electrode 18 coincides with the X-axis hairline 54. The distance $\Delta y$ the table has been moved is read on the scale 16. If the distance along the Y-axis between the X-axis hairline 51 on the reflective surface 35 and the image 42a of the center of the electrode is $\Delta a$, $\Delta a$ is equal to $\Delta y$. Then, the table 11 is moved along the X-axis until the image 42a coincides with the Y-axis hairline 55, so that naturally the image 42a coincides with the crossing point of the hairlines 54 and 55. The distance $\Delta x$ the table has been moved is read on the scale 15. Since the image 42a is reflected by both prisms 32, 33 and the prisms are moved independently of the microscope, the distance $\Delta b$ along the X-axis between the Y-axis hairline 55 and the image 42a is twice as long as $\Delta x$.

Since the distance a between the reference plane 63 and the hairline 51, the distance b between the reference plane 62 and the hairline 52 and the distance c between the intersection of hairlines 51 and 52 and the axis of the spindle 12 or the image 43 are all known, the image 42 is distanced from the reference plane 63 by a length of $a + \Delta y$ (i.e., $a + \Delta a$) along the Y-axis and from the reference plane 61 by a length of $b + c + 2\Delta x$ (i.e., $b+c+\Delta b$) along the X-axis. Thus, the position of the electrode relative to the table is known.

By reversing the above relation it is possible to place the electrode secured to the spindle at any desired position relative to the table, and by placing a work-piece at a predetermined position on the table it is possible to perform a required machining operation on the work-piece.

In the above embodiment, the microscope 20 and the prism device 31 are separate. It is possible to separate the microscope from the machine 10 and mechanically combine the microscope and the prism device 31. In this case, the microscope and the prism device are combined so that the hairlines 54 and 55 of the former coincide with the hairlines 51 and 52 of the latter. In practice the latter hairlines 51 and 52 may be omitted. In this case, the prism device 31 is fixed on the table 11 with the lateral surfaces 61 and 62 of the base 34 being pressed against the reference planes 63 and 64 of the table. Then, the table 11 with the prism device 31 and the microscope 20 thereon is moved along the X- and Y-axis such that the image 42a of the center of the electrode coincides with the crossing point of the hairlines 54 and 55 of the microscope. Under the condition, the image 42 of the center of the electrode is at a distance a from the plane 63 along the Y-axis and at a distance of $b + c$ from the plane 64 along the X-axis.

In a case where the position of the microscope 20 is fixed relative to the spindle 12, the same result can be obtained by moving the prism 33 alone along the X-axis. With this arrangement, the prism device is first fixed on the table 11, with the lateral surfaces 61 and 62 of the base 34 being pressed against the reference planes 63 and 64 of the table. Then, the table 11 is moved so that the hairlines 51 and 52 coincide with the hairlines 54 and 55. The operation so far is the same as previously mentioned. However, the prism 33 alone is then moved $\Delta x$ along the X-axis such that the image 42a of the center of the electrode coincides with the Y-axis hairline 52 on the prism 32. Then, the table 11 is moved $\Delta y$ along the Y-axis such that the image 42a coincides with the X-axis hairline 51 on the prism 32. Then, the image 42 is positioned at a distance of $a + \Delta a$ (i.e., $a + \Delta y$) from the reference plane 63 and a distance of $b + c + \Delta b$ (i.e., $b + c + 2\Delta x$) from the reference plane 64.

In the above embodiments, the prism device 31 comprises two prisms 32 and 33. It is possible to omit the prism 32 and directly look at the reflective surface of the prism 33 through the microscope. In this case, as shown in FIG. 5 crossed hairlines 65 and 66 are drawn on the reflective surface 67 of the prism 33. The positioning operation is similar to that previously mentioned, with the distance between the reference plane 64 and the Y-axis line 66 being kept at a constant value of $k$.

What I claim is:

1. In a spark discharge machining apparatus comprising a spark discharge electrode for machining a workpiece and a work-table for supporting a workpiece, said worktable being translatable for measured distances in two mutually perpendicular directions whereby a workpiece can be selectively aligned relative to said electrode, the improvement wherein said machining apparatus further comprises:

optical means for viewing a first reference point on the bottom surface of said electrode, said optical means comprising means defining a first reflective surface positionable between said electrode and said worktable for reflecting an image of said first reference point, a microscope for viewing an image of said first reference point reflected by said first reflective surface and means defining a second reference point appearing in the field of said microscope;

means for positioning said first reflective surface in a predetermined location relative to said worktable such that when said first reflective surface is positioned at said predetermined location relative to said worktable and said first and second reference points are viewed through said microscope and made to coincide, the displacements of said first reference point in said two directions from a location on said worktable are established.

2. The machining apparatus of claim 1 wherein said means defining said first reflective surface is a prism.

3. The machining apparatus of claim 1 wherein said means for positioning said first reflective surface comprises mutually engageable surfaces on said optical means and on said worktable.

4. The machining apparatus of claim 1 wherein said worktable includes a planar, horizontal surface for supporting a workpiece and two, mutually perpendicular, vertical surfaces bordering and extending upwardly from said horizontal surface, each of said vertical surfaces being parallel to one of said directions and wherein said optical means includes surfaces engageable with said vertical surfaces of said worktable for positioning said first reflective surface in said predetermined location relative to said worktable.

5. The machining apparatus of claim 1 wherein said second reference point is defined by two, perpendicular intersecting hairlines extending parallel to said first and second directions, respectively.

6. The machining apparatus of claim 1 wherein said means defining said second reference point is integral with said microscope.

7. The apparatus of claim 1 wherein said means defining said first reflective surface and said microscope are mechanically combined in a single unit supportable on said worktable.

8. The machining apparatus of claim 7 wherein said means defining said second reference point is integral with said microscope and wherein said apparatus further comprises means defining a third reference point on one of said reflective surfaces.

9. The machining apparatus of claim 1 wherein said first reflective surface is translatable measured distances in one of said directions independently of said worktable.

10. The machining apparatus of claim 9 wherein said third reference point is defined by two, perpendicular intersecting hairlines, one of which is parallel to one of said directions.

11. The machining apparatus of claim 1 further comprising means defining a second reflective surface positioned in a predetermined relation to said first reflective surface and to said microscope such that the image of said first reference point visible through said microscope is reflected from said second reflective surface.

12. The machining apparatus of claim 1 wherein said tool is a spark discharge electrode.

13. The machining apparatus of claim 1 wherein said worktable is translatable for measured distances in said two directions.

14. In a machining apparatus comprising a tool for machining a workpiece, a worktable for supporting a workpiece and means for effecting relative movement between said tool and said worktable for measured distances in two mutually perpendicular directions such that a workpiece can be selectively aligned relative to said tool, the improvement wherein said machining apparatus further comprises:

optical means for viewing a first reference point on the bottom surface of said tool, said optical means comprising means defining a first reflective surface positionable between said tool and said worktable for reflecting an image of said first reference point, a microscope for viewing an image of said first reference point reflected by said first reflective surface and means defining a second reference point appearing in the field of said microscope;

means for positioning said first reflective surface in a predetermined location relative to said worktable such that when said first reflective surface is positioned at said predetermined location relative to said worktable and said first and second reference points are viewed through said microscope and made to coincide, the displacements of said first reference point in said two directions from a location on said worktable are established.

* * * * *

PO-1050
(5/69)

UNITED STATES PATENT OFFICE
CERTIFICATE OF CORRECTION

Patent No. 3,782,830               Dated    January 1, 1974

Inventor(s)  Shoji Futamura

It is certified that error appears in the above-identified patent and that said Letters Patent are hereby corrected as shown below:

Claim 8, line 1, change "7" to --11--.

Claim 10, line 1, change "9" to --8--.

Claim 12, line 1, change "1" to --14--.

Claim 13, line 1, change "1" to --14--.

Signed and sealed this 8th day of October 1974.

(SEAL)
Attest:

McCOY M. GIBSON JR.                C. MARSHALL DANN
Attesting Officer                  Commissioner of Patents